(12) United States Patent
Tonapi et al.

(10) Patent No.: US 10,781,849 B2
(45) Date of Patent: Sep. 22, 2020

(54) INDEXING AND SYNCHRONIZING CLIP

(71) Applicant: GM GLOBAL TECHNOLOGY OPERATIONS LLC, Detroit, MI (US)

(72) Inventors: Suhas G. Tonapi, Troy, MI (US); James C O'Kane, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 229 days.

(21) Appl. No.: 16/106,263

(22) Filed: Aug. 21, 2018

(65) Prior Publication Data

US 2020/0063787 A1  Feb. 27, 2020

(51) Int. Cl.
*F16C 1/22* (2006.01)
*E05B 79/20* (2014.01)
*F16C 1/14* (2006.01)

(52) U.S. Cl.
CPC .............. *F16C 1/223* (2013.01); *E05B 79/20* (2013.01); *F16C 1/14* (2013.01)

(58) Field of Classification Search
CPC .. F60C 1/223; F60C 1/14; F60C 1/145; F60C 1/16; E05B 79/20; E05B 63/0056; E05B 63/143

See application file for complete search history.

(56) References Cited

U.S. PATENT DOCUMENTS

| | | | | |
|---|---|---|---|---|
| 5,567,011 A * | 10/1996 | Sessini | ................. | B60N 2/0232 297/284.4 |
| 6,880,424 B2 * | 4/2005 | McMillen | ................. | F16C 1/16 74/500.5 |
| 7,559,410 B2 * | 7/2009 | Funk | ..................... | B60T 13/746 188/156 |
| 8,366,059 B2 * | 2/2013 | Fannon | .................. | E05B 79/20 24/16 PB |
| 9,186,985 B2 * | 11/2015 | Kim | ...................... | B60K 15/05 |

FOREIGN PATENT DOCUMENTS

DE       202015103411 U1 * 10/2015 ............. F16C 1/223

* cited by examiner

*Primary Examiner* — Patrick Cicchino
(74) *Attorney, Agent, or Firm* — Quinn IP Law (57) ABSTRACT

An exemplary clip assembly for adjusting a length of a cable includes a base including a tab and a first stop member, a cover rotatably coupled to the base, and a barrel assembly nesting within the base and the cover. The base and the cover define a first passage extending longitudinally through the cover and the base. The barrel assembly includes a first barrel member having a first interaction surface and a first threaded channel, and a second barrel member includes a second interaction surface and a second threaded channel. The first and second interaction surfaces form a barrel interaction surface and the first and second channels define a second passage through the barrel assembly. The first and second passages have a common longitudinal axis and rotation of the barrel interaction surface results in longitudinal translation of the cable through the second passage of the barrel assembly.

20 Claims, 5 Drawing Sheets

FIG. 8

INDEXING AND SYNCHRONIZING CLIP

INTRODUCTION

The present invention relates generally to the field of vehicles and, more specifically, to an indexing and synchronizing clip to adjust and synchronize the release of two latches.

Rear side access panel door latching systems typically include two door latches. The latches are actuated using a handle assembly that connects to the latches using cables that exert a pull on a detent lever, releasing the latches. However, often the release of the two latches is not synchronous resulting in poor unlatching sound quality.

SUMMARY

Embodiments according to the present disclosure provide a number of advantages. For example, embodiments according to the present disclosure enable fine, incremental adjustment of a wire or cable length used, for example, as part of a rear side access door handle assembly. The indexing feature of the clip improves unlatching sound quality and perceived door quality by facilitating closer synchronization of the multiple latches of the door handle assembly.

In one aspect, a clip assembly includes a base including a first channel adjacent to a first end of the base, a second channel adjacent to a second end of the base opposite the first end, and a third channel disposed between the first and second channels, the third channel separated from the first channel by a first support surface and the third channel separated from the second channel by a second support surface, a tab extending from the first support surface and a first stop member extending from the second support surface, a cover rotatably coupled to the base, the base and the cover defining a first passage extending longitudinally through the cover and the base, the cover including an edge defining a plurality of openings in a top surface of the cover, and a barrel assembly nesting within the base and the cover. The barrel assembly includes a first barrel member including a half-cylindrical body including a first wall defining a first end of the first barrel member, a second wall defining a second end of the first barrel member opposite the first end, a first interaction surface positioned between the first and second walls, a second stop member aligned with the first stop member, and a plurality of indexing members and a second barrel member including a half-cylindrical body including a third wall defining a first end of the second barrel member, a fourth wall defining a second end of the second barrel member opposite the first end, and a second interaction surface positioned between the third and fourth walls. The first and second interaction surfaces form a rotatable interaction surface. The first wall and the third wall nest within the first channel of the base and the second wall and the fourth wall nest within the second channel of the base and the plurality of indexing members interact with the tab to permit rotation of the barrel assembly in a first direction.

In some aspects, each of the first and second interaction surfaces are textured.

In some aspects, the base further includes a first attachment assembly including a pivot attachment member and a pivot member and the cover further includes a second attachment assembly including a cover attachment member, and the cover attachment member engages with the pivot member to rotatably connect the cover to the base.

In some aspects, the first barrel member further includes a first barrel channel and the second barrel member further includes a second barrel channel, the first and second barrel channels defining a second passage, wherein the first passage and the second passage have a common longitudinal axis.

In some aspects, the first channel of the base is defined on one side by a first convex surface and the second channel of the base is defined on one side by a second convex surface.

In some aspects, each of the first and second walls are concave and each of the third and fourth walls are concave and the first and third walls interface with the first convex surface and the second and fourth walls interface with the second convex surface.

In some aspects, the first stop member interfaces with the second stop member to allow a predetermined amount of rotation of the barrel assembly in the first direction.

In some aspects, the barrel assembly rotates 320 degrees.

In some aspects, the plurality of indexing members are fin-shaped to permit rotation of the barrel assembly in the first direction and restrict rotation of the barrel assembly in a second direction that is opposite the first direction.

In some aspects, the base further includes a lock member extending from an outer surface of the base and the cover further includes an engagement member that receives the lock member to removably couple the cover to the base.

In another aspect, a system for adjusting a length of a cable includes a base, a cover rotatably coupled to the base, the base and the cover defining a first passage extending longitudinally through the cover and the base, the cover including an edge defining an interaction opening in a top surface of the cover, and a barrel assembly nesting within the base and the cover and at least partially extending through the interaction opening, the barrel assembly including a first barrel member including a first interaction surface and a first channel and a second barrel member including a second interaction surface and a second channel, the first and second interaction surfaces forming a barrel interaction surface and the first and second channels defining a second passage through the barrel assembly. Rotation of the barrel interaction surface results in longitudinal translation of the cable through the second passage of the barrel assembly.

In some aspects, the base further includes a first attachment assembly including a pivot attachment member and a pivot member and the cover further includes a second attachment assembly including a cover attachment member that engages with the pivot member to rotatably connect the cover to the base.

In some aspects, each of the first and second channels include a plurality of threads.

In some aspects, the base includes a first stop member and the first barrel member includes a second stop member aligned with the first stop member and interaction between the first and second stop members allows an amount of rotation of the barrel assembly.

In some aspects, the base includes a tab and the barrel assembly further includes a plurality of indexing members and wherein interaction between the indexing members and the tab allow rotation of the barrel assembly in a first direction and restrict rotation of the barrel assembly in a second direction opposite the first direction.

In yet another aspect, a clip assembly for adjusting a length of a cable includes a base including a tab and a first stop member, a cover rotatably coupled to the base, the base and the cover defining a first passage extending longitudinally through the cover and the base, the cover including an edge defining an interaction opening in a top surface of the cover, and a barrel assembly nesting within the base and the cover and at least partially extending through the interaction opening, the barrel assembly including a first barrel member including a first interaction surface, a first threaded channel, a second stop member, and at least one indexing member and a second barrel member including a second interaction surface, a second threaded channel, and at least one indexing member, the first and second interaction surfaces forming a barrel interaction surface and the first and second channels defining a second passage through the barrel assembly. The first and second passages have a common longitudinal axis and rotation of the barrel interaction surface results in longitudinal translation of the cable through the second passage of the barrel assembly.

In some aspects, interaction between the first and second stop members allows an amount of rotation of the barrel assembly.

In some aspects, interaction between the plurality of indexing members and the tab allow discrete rotation of the barrel assembly in a first direction and restrict rotation of the barrel assembly in a second direction opposite the first direction.

In some aspects, the base further includes a first attachment assembly including a pivot attachment member and a pivot member and the cover further includes a second attachment assembly including a cover attachment member that engages with the pivot member to rotatably connect the cover to the base.

In some aspects, the base further includes a lock member and the cover further includes an engagement member, wherein the engagement member receives the lock member to removably couple the cover to the base.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Some embodiments of rear access panel/rear side access (RAP/RSA) doors include an upper and lower latch assembly connected by a cable or wire. In some instances, release of the upper and lower latches is not synchronous, due to dimensional variations, among other considerations, resulting in poor unlatching sound quality and perceived door quality issues. A clip assembly according to embodiments discussed herein enables adjustment of the cable length between the upper and lower latches to improve synchronization of the upper and lower latch release. While the embodiments of the clip assembly discussed herein are discussed in the context of RAP/RSA door latch assemblies, the clip assembly may be used for any closure system including multiple latches including, for example and without limitation, sliding door latch assemblies and liftgate latch assemblies.

As shown in FIGS. 1-7, in some embodiments, a clip assembly 100 includes a base 102, a cover 104, and a barrel assembly including a first barrel member 106, and a second barrel member 108. The clip assembly 100 permits selective adjustment of a cable 5 passing through the barrel members of the clip assembly 100 due to interaction between the threaded ferrule 15 of the cable 5 with matching threads formed in the opening passing through the clip assembly 100, as discussed in greater detail herein. In some embodiments, each component of the clip assembly 100 is molded from a plastic or other moldable rigid material. In some embodiments, one or more of the components of the clip assembly 100 are integrally formed. In a preferred embodiment, the clip assembly 100 includes a "thumbwheel" feature that permits incremental adjustment of the length of a cable connecting each latch of a multiple latch assembly to a handle assembly. A plurality of indexing tabs on the first and second barrel members 106, 108 permit rotation of the thumbwheel in one direction only and enable lengthening rather than shortening of the free length of the cable. Permitting only lengthening of the free length of the cable reduces the risk of preloading the latch detent. Additionally, a stop feature restricts free rotation of the thumbwheel to reduce the risk of excessive lengthening of the cable length that could prevent release of one or both of the latches.

Figure 2:
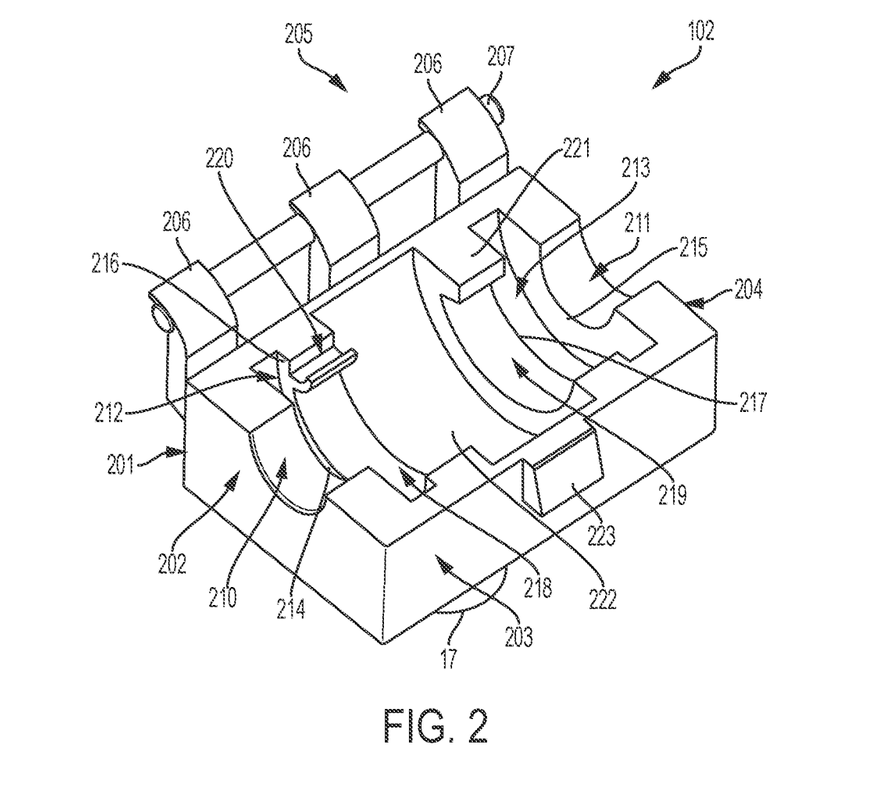
FIG. 2 is a perspective view of a clip base of the clip assembly of FIG. 1, according to an embodiment.

In some embodiments, as shown in FIG. 2, the base 102 is approximately rectangular and includes a first surface 201, a second surface 202, a third surface 203, and a fourth surface 204. The first and third surfaces 201, 203 are approximately parallel and contiguous with the second and fourth surfaces 202, 204.

In some embodiments, a first attachment assembly 205 extends from the first surface 201. In some embodiments, the attachment assembly 205 includes one or more pivot attachment members 206 (three are shown in FIG. 2). A pivot member 207 extends between the pivot attachment members 206. The pivot attachment members 206 support the pivot member 207 such that the pivot member 207 is separated from the main body of the base 102. As discussed in greater detail herein, the cover 104 rotates relative to the base 102 via connection with the pivot member 207. In some embodiments, the pivot member 207 is integrally formed with the pivot attachment members 206 as a molded assembly. In some embodiments, the attachment assembly 205 is integrally formed with the base 102.

A first surface 210 defines a curved, semi-circular opening in the second surface 202. A second surface 211 defines a curved, semi-circular opening in the fourth surface 204. The widths of the first and second surfaces 210, 211 are defined by the surfaces 202, 204 and edges 214, 215, respectively, as shown in FIG. 2. As discussed in greater detail herein, the curved openings allow passage of the threaded ferrule 15, and seating of the first and second barrel members 106, 108 that rotate to adjust a length of a threaded ferrule cable.

Adjacent to the curved, semi-circular openings defined by the surfaces 210, 211 are first and second channels 212, 213. The first channel 212 is defined on one side by the surface 214 and on the opposite side by a surface 216. Similarly, the second channel 213 is defined on side by the surface 215 and on the opposite side by a surface 217. In some embodiments, each of the surfaces 214, 215 is convex. The first and second channels 212, 213 receive wall members of the first and second barrel members 106, 108, as discussed in greater detail herein.

With continued reference to FIG. 2, a first support surface 218 is adjacent to the first channel 212. A second support surface 219 is adjacent to the second channel 213. Each of the support surfaces 218, 219 are curved to support the first and second barrel members 106, 108 and allow the first and second barrel members 106, 108 to rotate within the base 102 and the cover 104. Extending from the first support surface 218 is a tab 220. The tab 220 is, in some embodiments, a curved member extending from an interior surface of the base 102 towards the barrel assembly and is stationary (that is, the tab 220 does not rotate). The tab 220 interfaces with one or more indexing members located on the first and second barrel members 106, 108. The interaction between the tab 220 and the indexing members allows discrete rotation of the first and second barrel members 106, 108 within the clip assembly 100 in a first direction while restricting rotation in a second direction opposite the first direction.

Extending from the second support surface 219 is a first stop member 221. The first stop member 221 interfaces with a second stop member of the first barrel member 106 as the barrel assembly rotates within the clip assembly 100. Rotation of the first and second barrel members 106, 108 within the base 102 and cover 104 of the clip assembly 100 can be arrested by contact between the first and second stop members, as discussed in greater detail herein.

A central channel 222 extends between the first and second support surfaces 218, 219. The central channel 222 receives a serrated barrel portion of the first and second barrel members 106, 108. As the first and second barrel members 106, 108 rotate within the base 102 and the cover 104, the serrated barrel portion of the first and second barrel members 106, 108 freely rotates within the central channel 222. As discussed in greater detail herein, rotation of the serrated barrel portion is controlled by interface between the tab 220 and the first stop member 221 with corresponding indexing tabs and a second stop member located on one or both of the first and second barrel members 106, 108.

As shown in FIG. 2, in some embodiments, a lock member 223 extends from the third surface 203. The lock member 223 interfaces with an engagement member of the cover 104, as discussed in greater detail herein, to couple together the base 102 and the cover 104.

Figure 3:
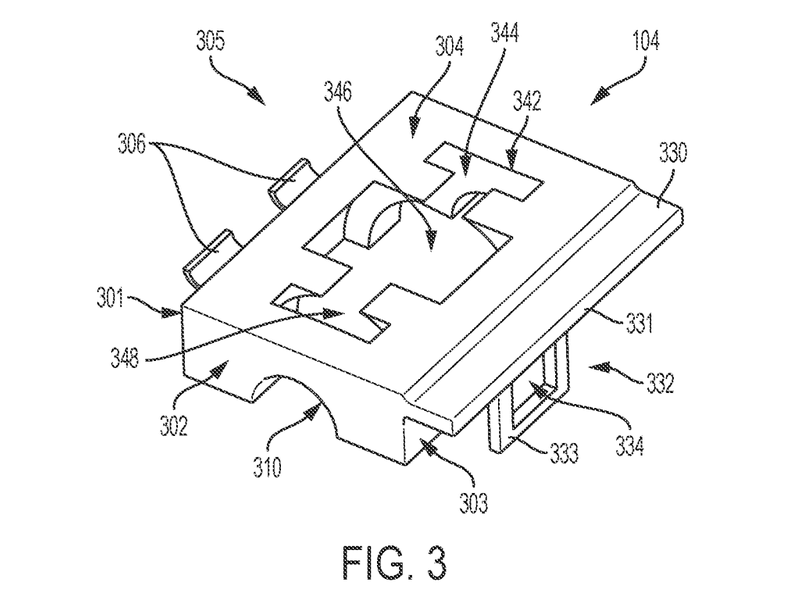
FIG. 3 is a perspective view of a clip cover of the clip assembly of FIG. 1, according to an embodiment.

With reference now to FIG. 3, the cover 104 includes a first surface 301, a second surface 302, a third surface 303, a fourth surface (hidden due to the perspective view orientation of FIG. 3), and a top surface 304. The first and third surfaces 301, 303 are approximately parallel and contiguous with the second surface 302 and the fourth surface.

In some embodiments, a second attachment assembly 305 extends from the first surface 301. In some embodiments, the attachment assembly 305 includes one or more cover attachment members 306 (two are shown in FIG. 3). The cover attachment members 306 interface with the pivot member 207 to allow the cover 104 to rotate relative to the base 102. In some embodiments, the cover attachment members 306 are actuate tangs that snap onto or otherwise engage with the pivot member 207 such that the cover 104 is connected to the base 102 and is also allowed to rotate relative to the base 102. In some embodiments, the attachment assembly 305 is integrally formed with the cover 104.

A first surface 310 defines a curved, semi-circular opening in the second surface 302. A similar surface defines a curved, semi-circular opening in the fourth surface. The first surface 310 is opposite to and preferably aligned with the first surface 210 in the base 102. The surfaces 210, 310, and 211 and the corresponding surface of the cover 104 define a cylindrical opening to allow passage of a threaded ferrule cable through the base 102 and the cover 104. Additionally, the channels, surfaces, and edges 212, 213, 214, 215, 216 and 217 of the base 102 as well as the corresponding surfaces on the cover 104 align and seat the first and second barrel members 106, 108.

A shelf 330 extends from the top surface 304. The shelf 330 forms an approximately orthogonal projection away from third surface 303. In some embodiments, an engagement member 332 extends from an outer edge 331 of the shelf 330. The engagement member 332 includes a frame 333 that defines an opening 334. The opening 334 receives the lock member 223 extending from the base 102 to removably secure the cover 104 to the base 102.

Figure 1:
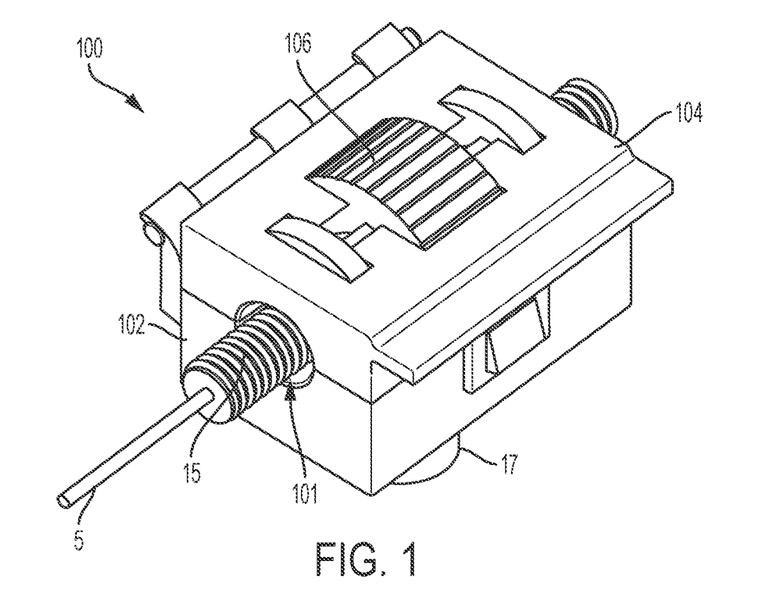
FIG. 1 is a perspective view of an indexing and synchronizing clip assembly, according to an embodiment.

An edge 342 defines a plurality of openings 344, 346, 348 in the top surface 304. A first opening 344 receives a first alignment member of the first and second barrel members 106, 108. Similarly, a second opening 348 receives a second alignment member of the first and second barrel members 106, 108. A third opening 346 receives a threaded or knurled barrel of the first and second barrel members 106, 108. As shown in FIG. 1, the knurled barrel extends through the third opening 346 to allow an installer to manipulate or rotate the barrel to adjust a length of the cable, as discussed in greater detail herein.

When rotatably coupled together via the first attachment assembly 205 and the second attachment assembly 305, the base 102 and cover 104 define a cylindrical passage 101 extending longitudinally through the clip assembly 100. The passage 101, along with channels formed in the first and second barrel members 106, 108, that form a second passage through the clip assembly 101, allow passage therethrough of a threaded ferrule 15 of a cable 5, as discussed in greater detail herein.

Figure 4A:
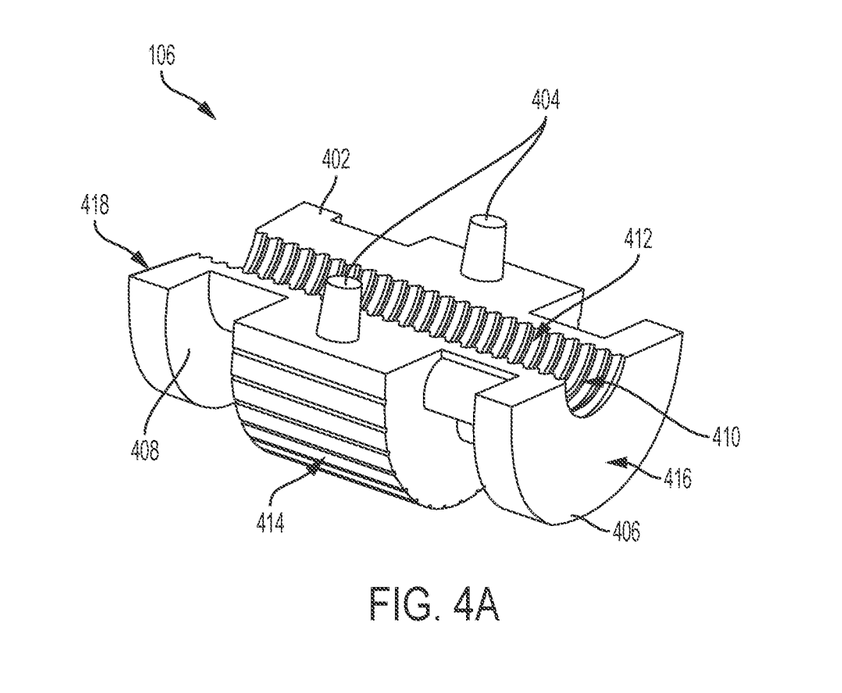
FIG. 4A is a perspective view of a first half barrel member of the clip assembly of FIG. 1, according to an embodiment.
Figure 4B:
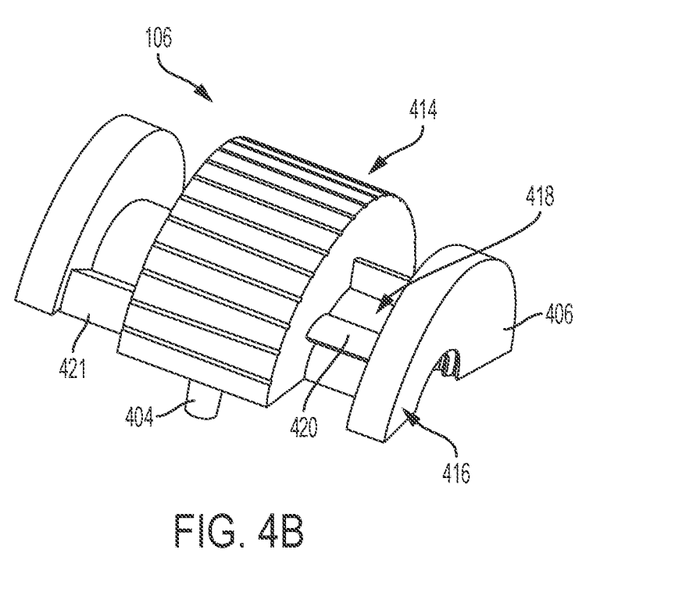
FIG. 4B is a perspective view of the half barrel member shown in FIG. 4B rotated approximately 180 degrees.
Figure 5:
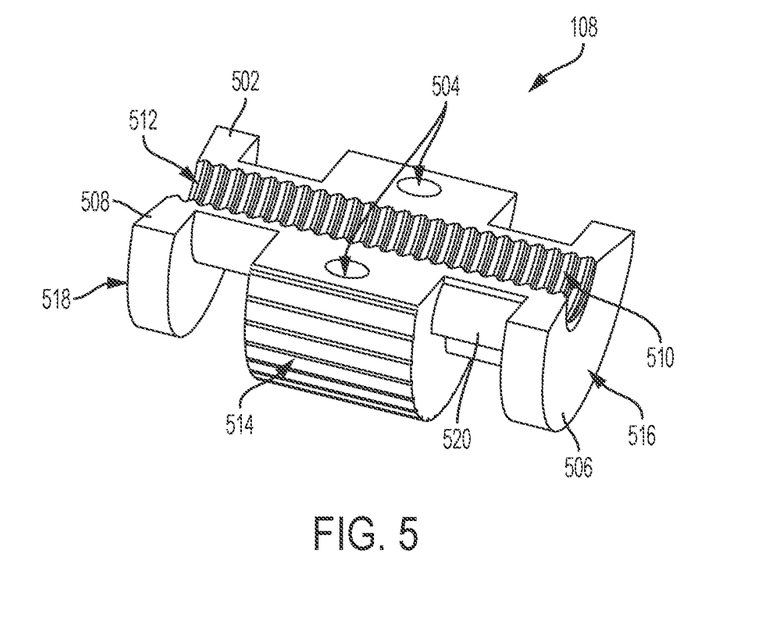
FIG. 5 is a perspective view of a second half barrel member of the clip assembly of FIG. 1, according to an embodiment.

The first and second barrel members 106, 108 are shown in detail in FIGS. 4A, 4B, and 5. The first barrel member 106, illustrated in FIG. 4, includes a body 402 and similarly the second barrel member 108, illustrated in FIG. 5, includes a body 502. The body 402 is approximately a half cylinder and the body 502 is approximately a half cylinder that mates with the body 402 to form a generally cylindrical barrel member. The first barrel member 106 includes a plurality of alignment pegs 404 (two are shown in FIG. 4). The alignment pegs 404 fit within locating openings 504 formed in the second barrel member 108. When the alignment pegs 404 are inserted into the locating openings 504, the first and second barrel members 106, 108 are restricted from lateral movement relative to each other and form a generally cylindrical barrel member as described in greater detail herein.

A first tapered wall 406 defines a first end of the first barrel member 106 and a second tapered wall 408 defines a second end of the first barrel member 106 opposite the first end. Similarly, a third tapered wall 506 defines a first end of the second barrel member 108 and a fourth tapered wall 508 defines a second end of the second barrel member 108 opposite the first end. In some embodiments, each of the tapered walls 406, 408, 506, 508 includes a concave portion 416, 418, 516, 518. The first tapered wall 406 and the third tapered wall 506 fit or nest within the first channel 212. Similarly, the second tapered wall 408 and the fourth tapered wall 508 fit or nest within the second channel 213. As discussed above, each of the first channel 212 and the second channel 213 are partially defined by the convex surfaces 214, 215. The first and second channels 212, 213 receive the tapered walls 406, 408, 506, 508 to support and align the first and second barrel members 106, 108 relative to the base 102 and the cover 104. The concave portions 416, 516 of the barrel members 106, 108 interface with the convex surface 214 to frictionally retain the components together during assembly. Similarly, the concave portions 418, 518 of the barrel members 106, 108 frictionally interface with the convex surface 215. In some embodiments, the cover 104 also includes similarly aligned convex surfaces (not shown) to interface with the concave portions 416, 418, 516, 518.

A first interaction surface 414 extends between the first and second tapered walls 406, 408 of the first barrel member 106. A second interaction surface 514 extends between the third and fourth tapered walls 506, 508 of the second barrel member 108. The first and second interaction surfaces 414, 514 form a barrel-shaped and rotatable interaction surface when the first and second barrel members 106, 108 are coupled together as part of the clip assembly 100. In some embodiments, one or both of the first and second interaction surfaces 414, 514 includes serration or other texture formed into the surface 414, 514 to facilitate easier manipulation by the installer.

A first channel 410 runs longitudinally through the first barrel member 106. A second channel 510 runs longitudinally through the second barrel member 108. The first and second channels 410, 510 define a cylindrical passage through the barrel assembly. The cylindrical passage through the barrel assembly has a common longitudinal axis with the passage 101. Each of the first and second channels 410, 510 includes a plurality of threads 412, 512. The plurality of threads 412, 512 preferably align such that the threads of the threaded ferrule cable 15 interfaces with the threads 412, 512 as the cable passes through the barrel assembly of the clip assembly 100. Rotation of the barrel assembly by interaction with one or both of the interaction surfaces 414, 514 results in longitudinal movement of the threaded ferrule cable through the cylindrical opening of the barrel assembly, as discussed in greater detail herein.

Figure 6:
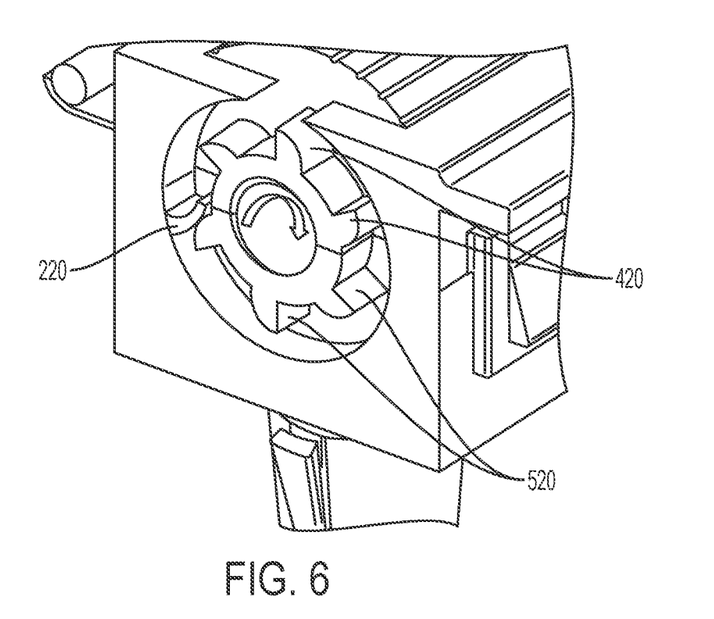
FIG. 6 is a partial sectional view of the clip assembly of FIG. 1 illustrating an indexing feature of the clip assembly, according to an embodiment.

As shown in FIGS. 4B, 5, and 6, in some embodiments, the first barrel member 106 includes at least one indexing member 420 (two are shown in FIG. 4B). The indexing members 420 extend from an outer surface 418 of a groove in the first barrel member 106 defined between the first tapered wall 406 and the first interaction surface 414. Similarly, the second barrel member 108 includes at least one indexing member 520 extending from the outer surface of a groove in the second barrel member 108 between the third tapered wall 506 and the second interaction surface 514. When the first and second barrel members 106, 108 are joined to form the barrel assembly, the indexing members 420, 520 form a ring of regularly-spaced members that allow discrete adjustment of the length of the cable 5.

With reference to FIG. 6, each of the indexing members 420, 520 is a fin shape including a curved surface and a substantially vertical surface. The fin shape of the plurality of indexing members 420, 520 (six are shown in FIG. 6) permits rotation of the barrel assembly in one direction as the curved edge will interface with the curved edge of the tab 220. Rotation of the barrel assembly in a second direction opposite the first direction is restricted as the tab 220 will interface with the straight edge of the indexing members 420, 520.

Figure 7:
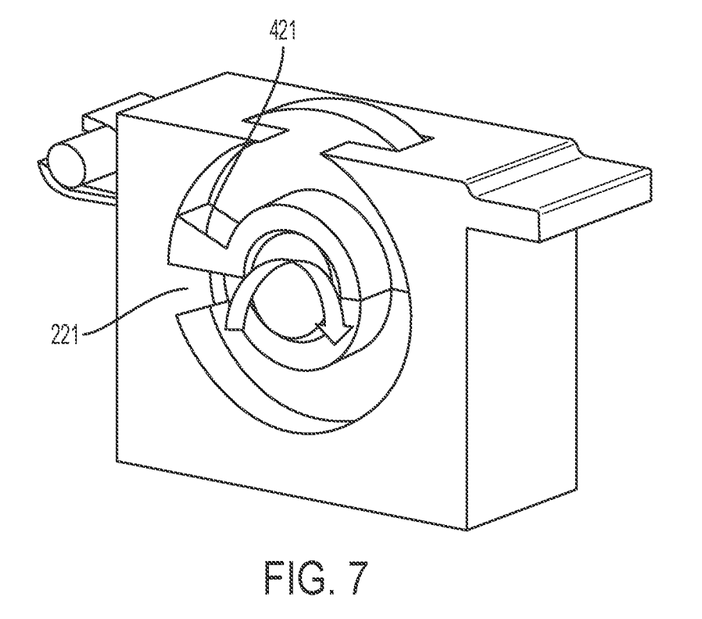
FIG. 7 is a partial sectional view of the clip assembly of FIG. 1 illustrating a stop feature of the clip assembly, according to an embodiment.

With continued reference to FIGS. 4B and 7, in some embodiments, the first barrel member 106 includes a second stop member 421. The second stop member 421 is disposed on the outer surface of the first barrel member 106 within a groove positioned between the second tapered wall 408 and the interaction surface 414. The first stop member 221 of the base 102 interfaces with the second stop member 421 to allow a predetermined amount of rotation of the first and second barrel members 106, 108 of the barrel assembly in a first direction. In some embodiments, the first and second stop members 221, 421 permit approximately 320 degrees of rotation of the barrel assembly within the clip assembly 100. In some embodiments, the predetermined amount of rotation allows approximately one pitch length of adjustment of the length of the cable 5. One 360-degree rotation of the barrel assembly is equal to one pitch length of ferrule movement or free length adjustment of the wire 5.

Figure 8:
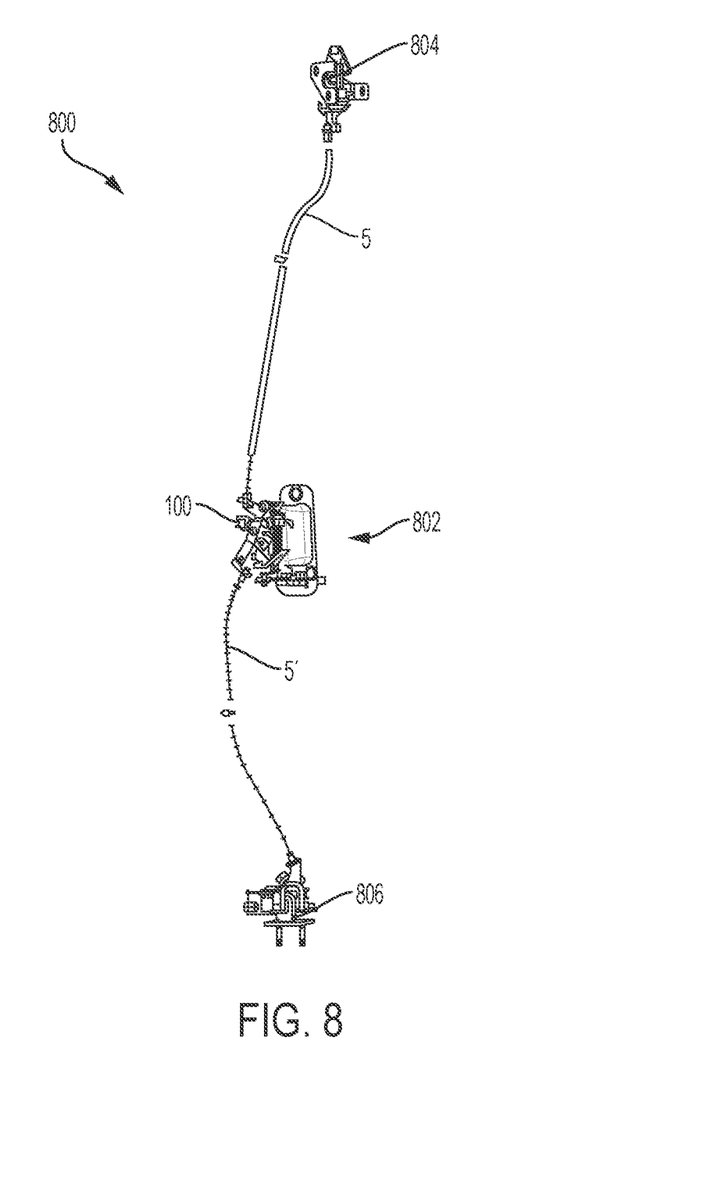
FIG. 8 is a schematic view of a rear side access latch assembly, according to an embodiment.

FIG. 8 illustrates a RSA door latching system incorporating the clip assembly 100, according to an embodiment. The door latching system 800 includes a handle assembly 802, a first or upper latch 804, and a second or lower latch 806. A cable 5 connects the first latch 804 to the handle assembly 802. A cable 5' connects the second latch 806 to the handle assembly 802. The handle assembly 802 includes at least one clip assembly 100 as discussed herein to adjust the free length of one or both of the cables 5, 5'.

In some embodiments, each of the upper and lower latch cables 5, 5' have a threaded ferrule, such as the threaded ferrule 15, which can snap onto the clip assembly 100 after the slack is removed from the length of the cable 5, 5'. Once the slack is removed, the installer can check to see if the upper and lower latches 804, 806 are synchronous by listening for a "double click" that can indicate that the upper latch 804 is releasing prior to release of the lower latch 806 or vice versa.

If the upper latch 804 is releasing prior to the lower latch 806, the length of the cable 5 connecting the upper latch 804 to the handle assembly 802 is shorter than the length of the cable 5' connecting the lower latch 806 to the handle assembly 802. In this example, lengthening the free length of the cable 5 delays the release of the upper latch 804 to better synchronize the release of the upper and lower latches 804, 806 upon activation of the handle assembly 802.

To increase the length of the cable 5, the installer rotates the barrel members 106, 108 via rotation of the interaction surfaces 414, 514. As discussed herein, the geometry of the indexing members 420, 520 and the tab 220 permit rotation of the barrel members 106, 108 in a first direction which results in an increase in the free length of the cable 5 while also restricting rotation of the barrel members 106, 108 in a second direction opposite the first direction to prevent potential preloading of the latch due to reduction of the length of the cable 5. The number and placement of the indexing members 420, 520 provides discrete adjustment of the amount of length of the cable 5 between the handle assembly 802 and the upper latch 804 added with each partial rotation of the barrel assembly.

It should be emphasized that many variations and modifications may be made to the herein-described embodiments the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A clip assembly, comprising:
a base including a first channel adjacent to a first end of the base, a second channel adjacent to a second end of the base opposite the first end, and a third channel disposed between the first and second channels, the third channel separated from the first channel by a first support surface and the third channel separated from the second channel by a second support surface, a tab extending from the first support surface and a first stop member extending from the second support surface;
a cover rotatably coupled to the base, the base and the cover defining a first passage extending longitudinally through the cover and the base, the cover comprising an edge defining a plurality of openings in a top surface of the cover; and
a barrel assembly nesting within the base and the cover and comprising
a first barrel member comprising a half-cylindrical body including a first wall defining a first end of the first barrel member, a second wall defining a second end of the first barrel member opposite the first end, a first interaction surface positioned between the first and second walls, a second stop member aligned with the first stop member, and a plurality of indexing members; and
a second barrel member comprising a half-cylindrical body including a third wall defining a first end of the second barrel member, a fourth wall defining a second end of the second barrel member opposite the first end, and a second interaction surface positioned between the third and fourth walls;
wherein the first and second interaction surfaces form a rotatable interaction surface;
wherein
the first wall and the third wall nest within the first channel of the base and the second wall and the fourth wall nest within the second channel of the base, and
the plurality of indexing members interact with the tab to permit rotation of the barrel assembly in a first direction.

2. The clip assembly of claim 1, wherein each of the first and second interaction surfaces are textured.

3. The clip assembly of claim 1, wherein the base further comprises a first attachment assembly including a pivot attachment member and a pivot member and the cover further comprises a second attachment assembly including a cover attachment member, and the cover attachment member engages with the pivot member to rotatably connect the cover to the base.

4. The clip assembly of claim 1, wherein the first barrel member further comprises a first barrel channel and the second barrel member further comprises a second barrel channel, the first and second barrel channels defining a second passage, wherein the first passage and the second passage have a common longitudinal axis.

5. The clip assembly of claim 1, wherein the first channel of the base is defined on one side by a first convex surface and the second channel of the base is defined on one side by a second convex surface.

6. The clip assembly of claim 5, wherein each of the first and second walls of the first barrel member are concave and each of the third and fourth walls of the second barrel member are concave and the first and third walls interface with the first convex surface and the second and fourth walls interface with the second convex surface.

7. The clip assembly of claim 1, wherein the first stop member interfaces with the second stop member to allow a predetermined amount of rotation of the barrel assembly in the first direction.

8. The clip assembly of claim 7, wherein the barrel assembly rotates 320 degrees.

9. The clip assembly of claim 1, wherein the plurality of indexing members are fin-shaped to permit rotation of the barrel assembly in the first direction and restrict rotation of the barrel assembly in a second direction that is opposite the first direction.

10. The clip assembly of claim 1, wherein the base further comprises a lock member extending from an outer surface of the base and the cover further comprises an engagement member that receives the lock member to removably couple the cover to the base.

11. A system for adjusting a length of a cable, comprising:
a base;
a cover rotatably coupled to the base, the base and the cover defining a first passage extending longitudinally through the cover and the base, the cover comprising an edge defining an interaction opening in a top surface of the cover; and
a barrel assembly nesting within the base and the cover and at least partially extending through the interaction opening, the barrel assembly comprising a first barrel member comprising a first interaction surface and a first channel and a second barrel member comprising a second interaction surface and a second channel, the first and second interaction surfaces forming a barrel interaction surface and the first and second channels defining a second passage through the barrel assembly;
wherein rotation of the barrel interaction surface results in longitudinal translation of the cable through the second passage of the barrel assembly.

12. The system of claim 11, wherein the base further comprises a first attachment assembly including a pivot attachment member and a pivot member and the cover further comprises a second attachment assembly including a cover attachment member that engages with the pivot member to rotatably connect the cover to the base.

13. The system of claim 11, wherein each of the first and second channels include a plurality of threads.

14. The system of claim 11, wherein the base comprises a first stop member and the first barrel member comprises a second stop member aligned with the first stop member and interaction between the first and second stop members allows an amount of rotation of the barrel assembly.

15. The system of claim 11, wherein the base comprises a tab and the barrel assembly further comprises a plurality of indexing members and wherein interaction between the indexing members and the tab allow rotation of the barrel assembly in a first direction and restrict rotation of the barrel assembly in a second direction opposite the first direction.

16. A clip assembly for adjusting a length of a cable, comprising:
a base comprising a tab and a first stop member;

a cover rotatably coupled to the base, the base and the cover defining a first passage extending longitudinally through the cover and the base, the cover comprising an edge defining an interaction opening in a top surface of the cover; and a barrel assembly nesting within the base and the cover and at least partially extending through the interaction opening, the barrel assembly comprising a first barrel member comprising a first interaction surface, a first threaded channel, a second stop member, and at least one indexing member and a second barrel member comprising a second interaction surface, a second threaded channel, and at least one indexing member, the first and second interaction surfaces forming a barrel interaction surface and the first and second channels defining a second passage through the barrel assembly;

wherein the first and second passages have a common longitudinal axis and rotation of the barrel interaction surface results in longitudinal translation of the cable through the second passage of the barrel assembly.

17. The clip assembly of claim 16, wherein interaction between the first and second stop members allows an amount of rotation of the barrel assembly.

18. The clip assembly of claim 16, wherein interaction between the at least one indexing members of the first and second barrels and the tab allows discrete rotation of the barrel assembly in a first direction and restricts rotation of the barrel assembly in a second direction opposite the first direction.

19. The clip assembly of claim 16, wherein the base further comprises a first attachment assembly including a pivot attachment member and a pivot member and the cover further comprises a second attachment assembly including a cover attachment member that engages with the pivot member to rotatably connect the cover to the base.

20. The clip assembly of claim 16, wherein the base further comprises a lock member and the cover further comprises an engagement member, wherein the engagement member receives the lock member to removably couple the cover to the base.

* * * * *